US010149157B2

(12) United States Patent
Cha

(10) Patent No.: US 10,149,157 B2
(45) Date of Patent: Dec. 4, 2018

(54) DEVICE COMMUNICATION MANAGEMENT IN A COMMUNICATION SYSTEM

(71) Applicant: OMNITRACS, LLC, Dallas, TX (US)

(72) Inventor: David S. Cha, San Diego, CA (US)

(73) Assignee: OMNITRACS, LLC, Dallas, TX (US)

( * ) Notice: Subject to any disclaimer, the term of this patent is extended or adjusted under 35 U.S.C. 154(b) by 187 days.

(21) Appl. No.: 14/994,381

(22) Filed: Jan. 13, 2016

(65) Prior Publication Data

US 2017/0201880 A1    Jul. 13, 2017

(51) Int. Cl.
| G06F 7/04 | (2006.01) |
| H04W 12/06 | (2009.01) |
| H04W 4/021 | (2018.01) |
| H04B 1/3822 | (2015.01) |
| H04L 29/06 | (2006.01) |
| H04W 4/80 | (2018.01) |
| H04W 76/11 | (2018.01) |

(52) U.S. Cl.
CPC .......... H04W 12/06 (2013.01); H04B 1/3822 (2013.01); H04L 63/0876 (2013.01); H04L 63/101 (2013.01); H04W 4/021 (2013.01); H04W 4/80 (2018.02); H04W 76/11 (2018.02)

(58) Field of Classification Search
CPC combination set(s) only.
See application file for complete search history.

(56) References Cited

U.S. PATENT DOCUMENTS

| 7,448,076 | B2 | 11/2008 | Ocepek et al. |
| 2003/0177246 | A1 | 9/2003 | Goodman et al. |
| 2013/0024515 | A1 | 1/2013 | Parker |
| 2013/0103939 | A1 | 4/2013 | Radpour |
| 2013/0318249 | A1* | 11/2013 | McDonough ........... H04L 67/02 709/228 |
| 2015/0089222 | A1* | 3/2015 | White ................. H04L 63/0428 713/168 |
| 2015/0221152 | A1* | 8/2015 | Andersen ........... G07C 9/00309 340/5.22 |
| 2015/0358430 | A1* | 12/2015 | Ishaq ..................... H04L 67/12 709/203 |

FOREIGN PATENT DOCUMENTS

| JP | 2005-303784 A | 10/2005 |
| WO | WO 2014/029774 A1 | 2/2014 |

OTHER PUBLICATIONS

International Search Report dated Apr. 20, 2017 issued in international patent application PCT/US2017/012773.

* cited by examiner

*Primary Examiner* — Brandon S Hoffman
*Assistant Examiner* — Samuel Ambaye
(74) *Attorney, Agent, or Firm* — Arent Fox LLP

(57) ABSTRACT

Aspects of the present disclosure generally relate to one or more systems, methods, and/or devices for secure communication between devices, such as devices within a vehicle. For example, some vehicles have integrated mobile computing platforms that enable communication with an extended productivity device. However, communication between the mobile computing platform and the extended productivity device may lack sufficient security. As such, the present disclosure provides for secure communication between the mobile computing platform and the extended productivity device by verifying, for example, an identity of the extended productivity device.

20 Claims, 9 Drawing Sheets

DEVICE COMMUNICATION MANAGEMENT IN A COMMUNICATION SYSTEM

BACKGROUND

Aspects of the present disclosure generally relate to communication systems, and more particularly to management of communication between devices within a vehicle.

Communication systems are widely deployed to provide various communication services such as telephony, video, data, messaging, broadcasts, and so on. These systems may be deployed within a vehicle to provide enhanced logistical capabilities. For example, some delivery vehicles include integrated communication systems in the form of an electronic system allowing the driver to transmit information to and receive information from a remote host device. Such information may include, for example, route information, which assists the driver in reaching a destination point of delivery by displaying the route information on a screen. Some vehicle communication systems may also communicate wirelessly with devices within the vehicle. There may be a lack of security with some vehicle communication systems, however, as some communication systems may be readily accessed by any device seeking access. For example, if a vehicle communication system includes, for example, a Bluetooth and/or WIFI-Direct communication interface, then in some cases any other device having a similar Bluetooth and/or WIFI-Direct communication interface may be able to monitor communications of the vehicle communication system and/or communicate with the vehicle communication system. As such, it may be desirable to provide secure communication between devices within a vehicle.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

In accordance with some aspects, a present method relates to secure communication between devices. The described aspects include detecting, at an electronic device, that a first device is within a communication range of the electronic device according to one or more communication protocols. The described aspects further include establishing a restricted communication session with the first device based on detecting that the first device is within communication range of the electronic device. The described aspects further include receiving, via a first communication channel associated with the one or more communication protocols, an authentication request including a first device identifier from the first device in response to establishing the initial communication session with the first device. The described aspects further include determining whether a device identifier whitelist includes the first device identifier in response to receiving the authentication request, wherein the device identifier whitelist permits a device having an associated device identifier within the device identifier whitelist to communicate with the electronic device. The described aspects further include, in accordance with a determination that the device identifier whitelist includes the first device identifier, permitting an unrestricted communication session with the first device. The described aspects further include, in accordance with a determination that the device identifier whitelist does not include the first identifier, terminating the restricted communication session with the first device.

In another aspect, a present non-transitory computer readable medium comprises code for secure communication between devices. The described aspects detecting that a first device is within a communication range of the electronic device according to one or more communication protocols. The described aspects further include establishing a restricted communication session with the first device based on detecting that the first device is within communication range of the electronic device. The described aspects further include receiving, via a first communication channel associated with the one or more communication protocols, an authentication request including a first device identifier from the first device in response to establishing the initial communication session with the first device. The described aspects further include determining whether a device identifier whitelist includes the first device identifier in response to receiving the authentication request, wherein the device identifier whitelist permits a device having an associated device identifier within the device identifier whitelist to communicate with the electronic device. The described aspects further include, in accordance with a determination that the device identifier whitelist includes the first device identifier, permitting an unrestricted communication session with the first device. The described aspects further include, in accordance with a determination that the device identifier whitelist does not include the first identifier, terminating the restricted communication session with the first device.

In another aspect, a present apparatus relates to secure communication between devices. The described aspects include a processor and a memory coupled to the processor, wherein the memory includes instructions executable by the processor to detect that a first device is within a communication range of the electronic device according to one or more communication protocols. The described aspects further establish a restricted communication session with the first device based on detecting that the first device is within communication range of the electronic device. The described aspects further receive, via a first communication channel associated with the one or more communication protocols, an authentication request including a first device identifier from the first device in response to establishing the initial communication session with the first device. The described aspects further determine whether a device identifier whitelist includes the first device identifier in response to receiving the authentication request, wherein the device identifier whitelist permits a device having an associated device identifier within the device identifier whitelist to communicate with the electronic device. The described aspects further permit an unrestricted communication session with the first device in accordance with a determination that the device identifier whitelist includes the first device identifier. The described aspects further terminate the restricted communication session with the first device in accordance with a determination that the device identifier whitelist does not include the first identifier.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

Figure 1:
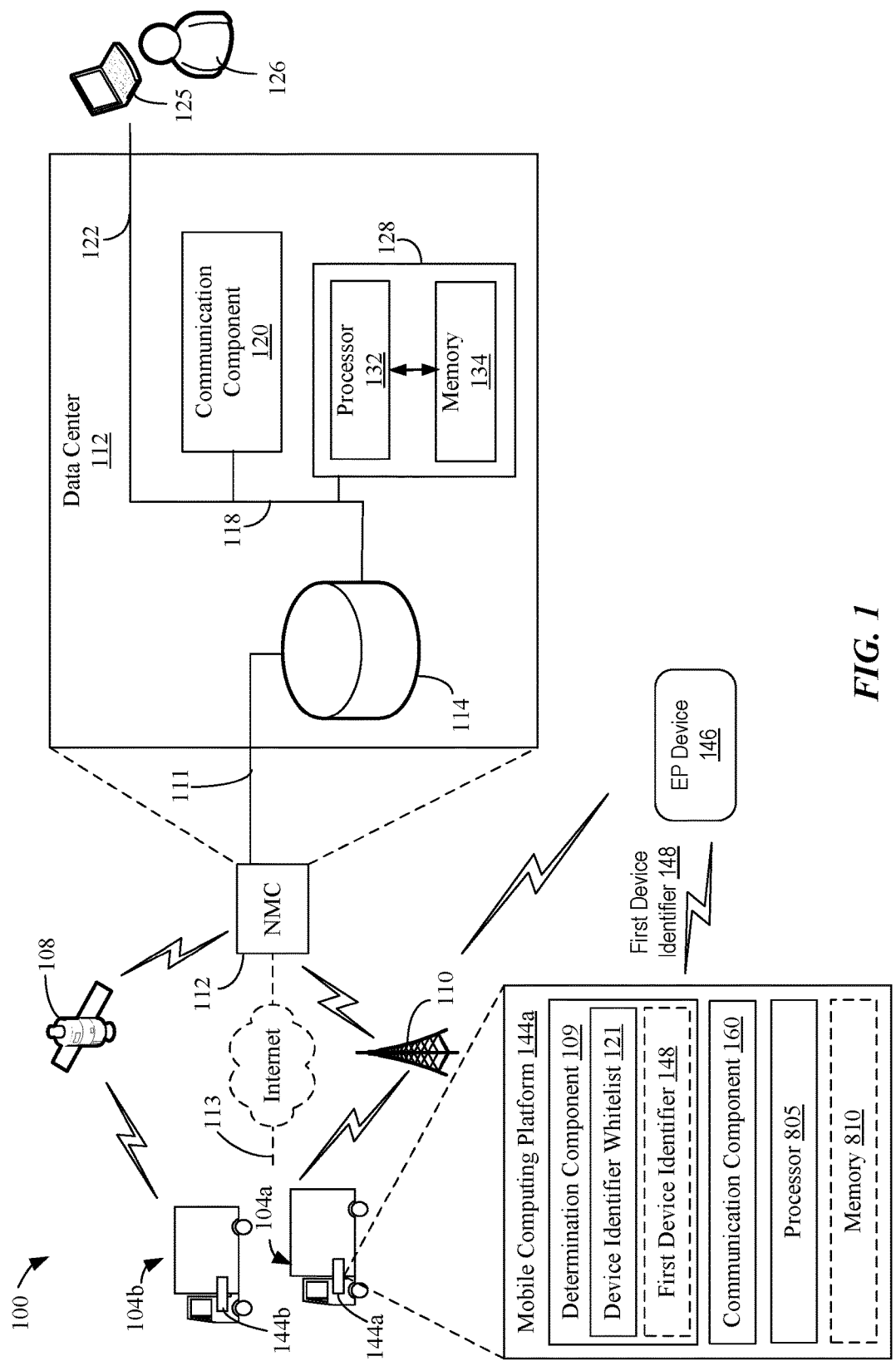
FIG. 1 is a functional block diagram of example elements of an aspect of a system including mobile computing platform configured to enable secure communication between devices.

Various aspects of the systems, apparatuses, and methods are described more fully hereinafter with reference to the accompanying figures. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the systems, apparatuses, and methods disclosed herein, whether implemented independently of, or combined with, any other aspect described herein. For example, an apparatus may be implemented or a method may be practiced using any number of the aspects set forth herein. In addition, the scope of the present aspects is intended to cover such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the aspects are mentioned, the scope of the disclosure is not intended to be limited to particular benefits, uses, or objectives. Rather, aspects of the disclosure are intended to be broadly applicable to different communication technologies, system configurations, networks, and transmission protocols, some of which are illustrated by way of example in the figures and in the following description of the aspects. The detailed description and figures are merely illustrative of the disclosure rather than limiting, the scope of the disclosure being defined by the appended claims and equivalents thereof.

The present aspects generally relate to secure communication between devices. Specifically, some vehicles (e.g., trucks) may include on-board management systems that provide various functionalities to a driver of the vehicle and/or a centralized management center. For example, at a macro level, the on-board management systems may permit a centralized management center to track and manage a fleet of vehicles. Yet, at a micro level, these on-board management systems may interface directly with the driver via an extended productivity (EP) device (e.g., smart phone). For instance, an on-board management system may provide various types of information to the driver via the extended productivity device, including information such as, but not limited to, messages from the centralized management center, workflow data, and/or driver-specific information.

However, in some aspects, the information received from the centralized management center may be considered sensitive and/or confidential, and intended only for a particular recipient (e.g., driver). Yet, some on-board management systems may permit easy access to the centralized management center, and in turn, the data residing on or at the centralized management center. Such easy access may result in unauthorized retrieval or manipulation of information at the centralized management center. For example, as some on-board management systems do not include any, or at most, minimal security measures to prevent unauthorized access, any other extended productivity device may be able connect to the centralized management center via the on-board management system and access its data. Nonetheless, secure communication may be desired because there may be applications running for specific entities that exchange sensitive information.

Accordingly, the present aspects provide one or more solutions to ensure that the extended productivity devices intended to communicate with the on-board management system on the vehicles are authorized extended productivity devices (e.g., devices part of a customer or fleet of vehicles). As such, authentication of an extended productivity device by the on-board management system, or vice-versa, would allow for secure communication between systems and devices and avoid non-authorized devices from participating in such communications. As a result, data that is exchanged between an authorized extended productivity device and the on-board management system would be considered secure.

Various aspects will now be described with reference to the drawings. In the following description, for purposes of explanation, numerous specific details are set forth in order to provide a thorough understanding of one or more aspects. It should be understood, however, that such aspect(s) may be practiced without these specific details.

Referring now to FIG. 1, in an aspect, a communication system 100 includes one or more components and/or modules for implementing secure communication between devices in conjunction with the operation of one or more vehicles. As used herein, the term "component" and/or "module" may one of the parts that make up a device, may be hardware or software or firmware, and may be divided into other modules and/or distributed across one or more processors.

In an aspect, communication system 100 may include one or more mobile computing platforms (MCP) 144a and 144b, which may be configured to facilitate secure communication with one or more devices, such as an extended productivity (EP) device 146 (e.g., a smartphone, tablet computer, etc.). Further, communication system 100 may include network management center (NMC) 112 configured to communicate with one or more vehicles 104a and 104b via MCP 144a and 144b, which may be located on each vehicle 104a and 104b, or associated with each driver of each vehicle 104a and 104b. In an aspect, MCP 144a and MCP 144b may be coupled to a respective vehicle, such as, but not limited to vehicle 104a and vehicle 104b.

The communication system 100 may include one or more fleets of vehicles 104a and 104b, each fleet having at least one vehicle. In some aspects, a fleet may include tens, hundreds or thousands of vehicles. An example fleet is illustrated as having two vehicles, e.g., vehicle 104a and vehicle 104b. Additional fleets (not shown) are contemplated, but not shown. In implementations, each MCP 144a and 144b may be configured to collect and transmit data associated with the operation of each respective vehicle 104a and 104b to the NMC 112.

In an aspect, MCP 144a and 144b, and its corresponding components and/or modules may be implemented as a software application defined by code or instructions stored in a computer-readable medium and executed by a processor, and/or as hardware (e.g., a specially programmed processor module), and/or as firmware. According to the present aspects, one of the components of MCP 144a (or, similarly, MCP 144b) may include determination component 109 which may be configured to enable secure communications with another device, such as EP device 146.

Specifically, for example, MCP 144a may facilitate secure communication with EP device 146 by operating determination component 109 to verify the authenticity of EP device 146 using its device identifier. For example, after receiving, via communication component 160, a first set of device identifiers from NMC 112, MCP 144a be configured to detect that a first device, such as but not limited to, EP device 146, is within a communication range of MCP 144a according to one or more communication protocols. In some aspects, the communication protocols may correspond to Bluetooth and/or Wi-Fi. Further, upon detecting that EP device 146 is within a communication range (e.g., via Bluetooth within the vehicle 104a), MCP 114a may establish a restricted communication session with EP device 146. In some aspects, the restricted communication session may correspond to a pairing session associated with a respective communication protocol.

Following an establishment of the initial communication session (e.g., pairing session) between MCP 144a and EP device 146, MCP 144a may receive, via a communication channel associated with the one or more communication protocols, an authentication request including a first device identifier 148 from EP device 146. In some aspects, the authentication request may include a version identifier of an application running on EP device 146. For example, the application may be a secure communication application residing at EP device 146.

In an aspect, MCP 144a may include determination component 109, which may be configured to determine whether a device identifier whitelist 121 includes the first device identifier 148 within the device identifier whitelist 121 to facilitate secure communication with EP device 148. In some aspects, the device identifier whitelist 121 may be preconfigured into MCP 144a and/or determination component 109. Moreover, in other aspects, the device identifier whitelist 121 may be received by MCP 144a and/or determination component 109 via satellite 108, communication channel 113 and/or base station 110 from NMC 112. For example, MCP 144a may receive the set of device identifiers that define the device identifier whitelist 121 according to an over-the-air communication protocol, such as one of a wide local area network protocol or a terrestrial protocol. In another aspect, the one or more communication protocols include one of Bluetooth or a wireless local area (WLAN) network protocol.

In an aspect, for example, MCP 144a and/or determination component 109 may be configured to receive via a second communication channel (e.g., between NMC 112 and MCP 144a) different from the first communication channel, a set of device identifiers associated with EP devices which may be authorized to communicate with MCP 144a. Specifically, for instance, MCP 144a and/or determination component 109 may be configured to receive a first set of device identifiers including the first device identifier 148 associated with EP device 146 from a host entity, such as, but not limited to, NMC 112. Further, MCP 144a and/or determination component 109 may generate or construct the device identifier whitelist 121 including one or more device identifiers from the first set of device identifiers within device identifier whitelist 121 in response to receiving the first set of device identifiers from the host device (e.g., NMC 112). In some aspects, the host device or entity (e.g., NMC 112) may directly provide the device identifier whitelist 121 including the set of the device identifiers to MCP 144a.

As such, in some aspects, MCP 144a may initially be provisioned by receiving one of a device identifier whitelist 121 from NMC 112 or a first set of device identifiers for subsequent formation of device identifier whitelist 121 from NMC 112. For instance, MCP 144a may receive a configuration message including the first set of device identifiers from NMC 112 via the first communication channel (e.g., via base station 110 and/or Internet 113). In some aspects, EP device 146 may also receive a provisioning message including one or more identifiers specific to identifying EP device 146 from a host entity (e.g., different from NMC 112) via a second communication channel (e.g., via base station 110 and/or Internet 113).

Additionally, to maintain an up-to-date device identifier whitelist 121, MCP 144a and/or determination component 109 may adjust or update the device identifier whitelist 121 based on one or both of a subsequent whitelist received from a host entity (e.g., NMC 112) or a second set of device identifiers. Specifically, for example, MCP 144a and/or determination component 109 may be configured to receive a second set of identifiers including a second device identifier associated with a second device from the host entity (e.g., NMC 112) and different from the first set of identifiers. MCP 144a and/or determination component 109 may determine whether one or more device identifiers including the first device identifier 148 from the first set of device identifiers are absent from the second set of identifiers, and adjust (e.g., add or remove) the device identifier whitelist 121 based on determining that one or more device identifiers including the first device identifier 148 from the first set of device identifiers are absent from the second set of identifiers. In this aspect, each of the first set of device identifiers including the first device identifier 148 and the second set of device identifier including the second device identifier may be one of a mobile directory number (e.g., phone number) or a device identifier generated by a host entity.

As such, MCP 144a and/or determination component 109 may be configured to permit an unrestricted communication session with EP device 146 based on determining that the device identifier whitelist 121 includes the first device identifier 148 (e.g., mobile directory number). In some aspects, MCP 144a and/or determination component 109 may permit an unrestricted communication session with EP device 146 via a token and, optionally, one or more other items, can be used to authenticate the EP device and enable secure communications. Specifically, a communication token that enables secure communication between the electronic device and the EP device 146 may be generated at MCP 144a and sent to EP device 146 based on determining that the device identifier whitelist 121 includes the first device identifier 148. Further, one or more of an address of the MCP 144a (e.g., electronic (IP) address of MCP 144a), a driver identifier scanning enablement indication, or a workflow task message indicating one or more workflows for a user of EP device 146, may be sent to EP device 146. In an aspect, for example, the communication token, and optionally one or more of the address of the MCP 144a, driver identifier scanning enablement indication, or workflow task message, enables one or both of a synchronization of data between MCP 144a and EP device 146 or a status retrieval of one or more messages or files of EP device 146.

Further, in an aspect, as part of determining whether to grant access to the EP device 148, and in addition to determining whether the device identifier of EP device 148 is included within device identifier whitelist 121, MCP 144a and/or determination component 109 may determine whether the version identifier of the application running on EP device 146 satisfies a compatible version identifier at MCP 144a. Accordingly, MCP 144a and/or determination component 109 may permit communication with EP device 148 based on also determining that the version identifier of the application running on EP device 146 satisfies the compatible version identifier at MCP 144a.

However, in order to prevent unauthorized access to secure information at MCP 144a, or NMC 112 via MCP 144a, MCP 144a and/or determination component 109 may be configured to terminate the restricted communication session with EP device 146 and as such, prevent an establishment of a secure communication session with EP device 146 based on determining that the device identifier whitelist 121 does not include the first identifier 148. Additionally, in some aspects, the restricted communication session may also be terminated based on determining that the version identifier of the application running on EP device 146 does not satisfy the compatible version identifier at MCP 144a.

In some aspects, MCP 144a may also include a processor 805 configured to execute computer-readable code and/or instructions, and/or a memory 810 configured to store computer-readable code, where the processor 805 and/or memory 810 may define all or part of the determination component 109 and also may store data associated with the components and/or MCP 144a. MCP 144a may also include a user interface or display, a mobile application server, and a communications module (e.g., including the one or more transceivers, and one or more of terrestrial and Wi-Fi modems, one or more antennae, a GPS module, and a satellite communications module). For example, in an aspect, MCP 144a may include, but is not limited to, an MCP 200 platform sold by OMNITRACS LLC of Dallas, Tex.

As an example only, each vehicle 104 may be in bi-directional communication with NMC 112 over at least one communication channel. In the example shown in FIG. 1, each vehicle 104 is in bi-directional communication with the NMC 112 over at least one of a satellite-based communication system 108 or a terrestrial-based system 110 (e.g., a wireless communication system using a communication protocol/technology such as, but not limited to, GSM, CDMA, TDMA, WCDMA, EDGE, OFDM, GPRS, EV-DO, LTE, Wi-Fi, Bluetooth, or, when the vehicle is stopped, via a wired connection 113 through the Internet). Depending on many factors, data may be exchanged with the vehicles 104 using one or both of the satellite communication system 108 and the terrestrial-based communication system 110.

In an aspect, many different types of data are collected and transferred from the vehicles 104 to the NMC 112. Examples of such data include, but are not limited to, vehicle performance data, driver performance data, critical events, messaging and position data, location delivery data, and many other types of data. All of the information that is communicated to and from the vehicles 104 may be processed via the NMC 112. The NMC 112 can be considered as a data clearinghouse that receives all data that is transmitted to and received from the vehicles 104. Moreover, in an aspect, NMC 112 may include one or more back-end servers. Thus, in some aspects, the collected information (e.g., device identifiers) may periodically (e.g., every x minutes, where x is a whole number, or once a day, or upon availability of a wired or wireless connection) be transmitted from the MCP 144a to the NMC 112 for analysis and record keeping.

The communication system 100 also includes a data center 112, which may be part of or in communication with NMC 112. The data center 112 illustrates one possible implementation of a central repository for all of the data received from each of the vehicles 104. As an example, as mentioned above many different types of data are transmitted from the vehicles 104 to the NMC 112. In the case where data center 112 is in communication with NMC 112, the data may be transmitted via connection 211 to the data center 112. The connection 111 may comprise any wired or wireless dedicated connection, a broadband connection, or any other communication channel configured to transport the data. Moreover, in an aspect, data center 112 may include one or more back-end servers analyzing the one or more parameters transmitted from the one or more MCP(s) 144a. Additionally or alternatively, data may also be exchanged between the plurality of MCP(s) 144a using, for example, peer-to-peer (P2P) communication without the involvement of the NMC 112.

In an aspect, the data center 112 may include communication component 120, which may be configured to receive the sets of device identifiers from one or more host entities (e.g., customers) and form or generate the device identifier whitelist 121 for subsequent forwarding to EP device 148, or directly forward the sets of device identifiers to EP device 148. Further, communication component 120 may be configured to adjust device identifier whitelist 121 by adding and/or removing device identifiers as they are received from one or more host entities. Communication component 120 may then forward or provide, via a communication channel, the adjusted device identifier whitelist 121 to MCP 144a.

In an aspect, for example, data center 112 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems.

For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 212 may include additional and/or different application servers.

In some aspects, EP device 146 may include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), a global positioning system device, or any other suitable device that is configured to communicate via a wireless medium.

Figure 2:
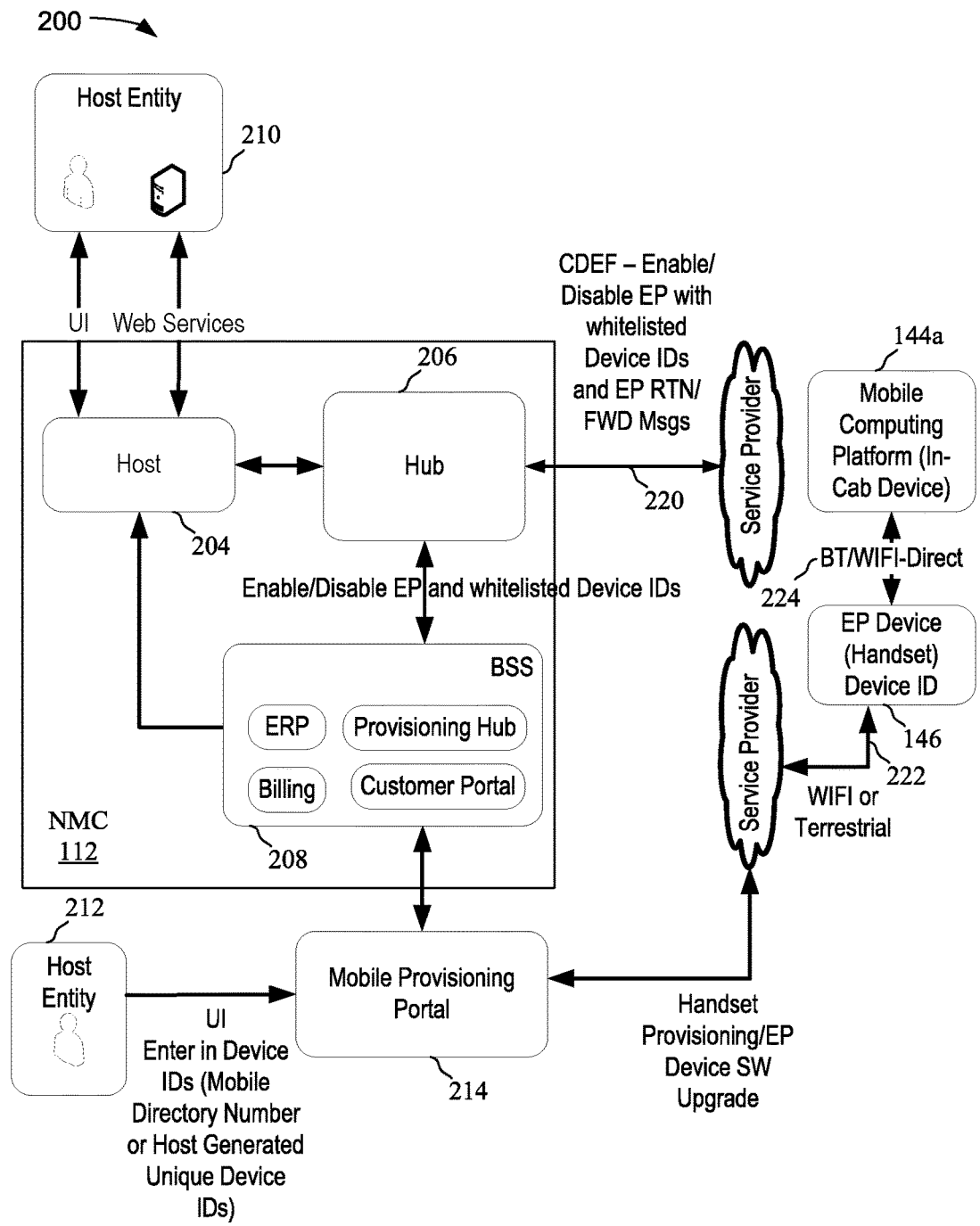
FIG. 2 is a block diagram of example elements of an additional aspect of a system including mobile computing platform configured to enable secure communication between devices.

FIG. 2 illustrates a block diagram of example elements of an aspect of communication system 200 including MCP 216 configured to enable secure communication with EP device 218. For instance, host entity 212 may initially, via a UI, enter or provide one or more device identifiers (e.g., mobile directory number and/or host generated unique device identifier). In some aspects, host entity 212 may be a fleet manager having a bundle (one or more) of EP devices 146 or may possess identification information of authorized or approved EP devices, including some that may already be in the possession of drivers. The identifiers may be sent to one or both NMC 112 via mobile provisioning portal 214 or the EP device 146. NMC 112 may, via BSS 208 and/or Hub 206, upon receiving the one or more identifiers, enable and/or disable communication with one or more EP devices associated with the one or more identifiers, and generate a whitelist 121 including the one or more identifiers.

NMC 112 may then send, via Hub 206, either the one or more identifiers and/or the whitelist 121 to MCP 144a via communication channel 220. Specifically, NMC 112 may send a configuration definition including the whitelist 121 to the MCP 144a (e.g., via over-the-air). In some aspects, EP device 146 may be provisioned with software associated with one or more applications, which in some aspects may be used to verify (e.g., using its version identifier) that EP device 146 is authorized for secure communication with one or more MCPs 144. Additionally, as part of the provisioning, EP device 146 may be provided or associated with a device identifier, which also may be used to verify that EP device 146 is authorized for secure communication with one or more MCPs 144. The provisioning information (e.g., one or more of mobile directory number, respective device identifier and/or software application version) may be sent via a communication channel 222 (e.g., over Wi-Fi or terrestrial connection). EP device 146 may then provide the provisioned information to MCP 144a to authenticate EP device 146 for secure communication with MCP 144a.

As such, in one example use case that should not be construed as limiting, when the EP device 146 attempts to connect to the MCP 144a, EP device 146 initially sends its device ID to the MCP 144a. MCP 144a then determines whether the device ID of EP device 146 matches an identifier in the whitelist 121. If MCP 144a determines that the device ID is part of or included within the whitelist 121, MCP 144a may generate a communication token and permit a secured connection with EP device 146. However, if MCP 144a determines that the device ID is not part of or included within the whitelist 121, then MCP 144a may prevent EP device 146 from establishing a connection and exchanging information with MCP 144a. As such, EP device 146, via MCP 144a and based on provisioning by host 204, may communicate with host entity 210 after successful authentication by MCP 144a. For example, a driver can use an EP device to connect to MCP 144a and communicate with NMC 112, in particular, to access delivery information (e.g., addresses), obtain route information (e.g., for deliveries), and/or provide delivery confirmations.

Figure 3:
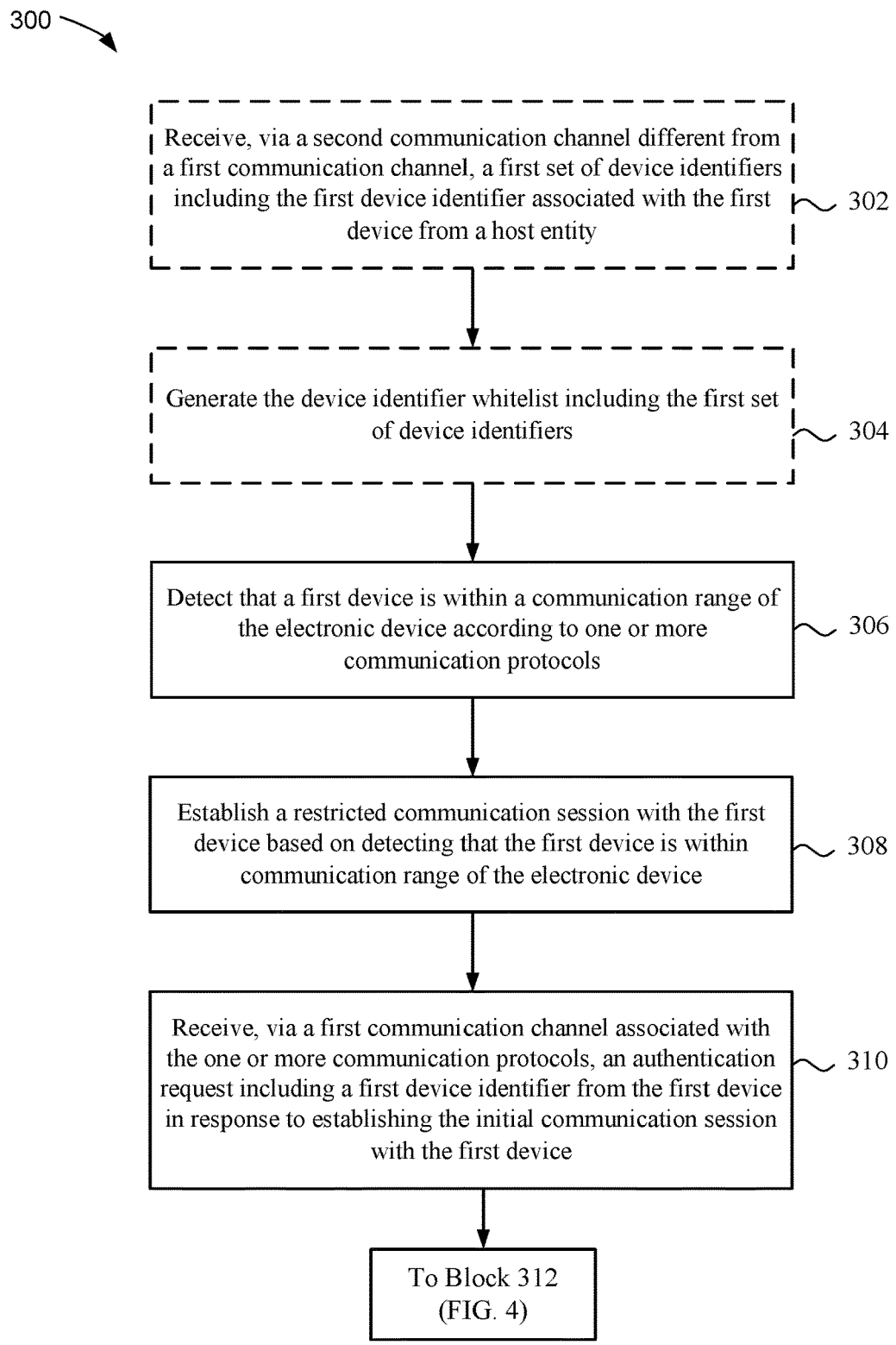
FIGS. 3-5 are flowcharts of an aspect of a method of secure communication between devices in accordance with some aspects of the present disclosure.
Figure 4:
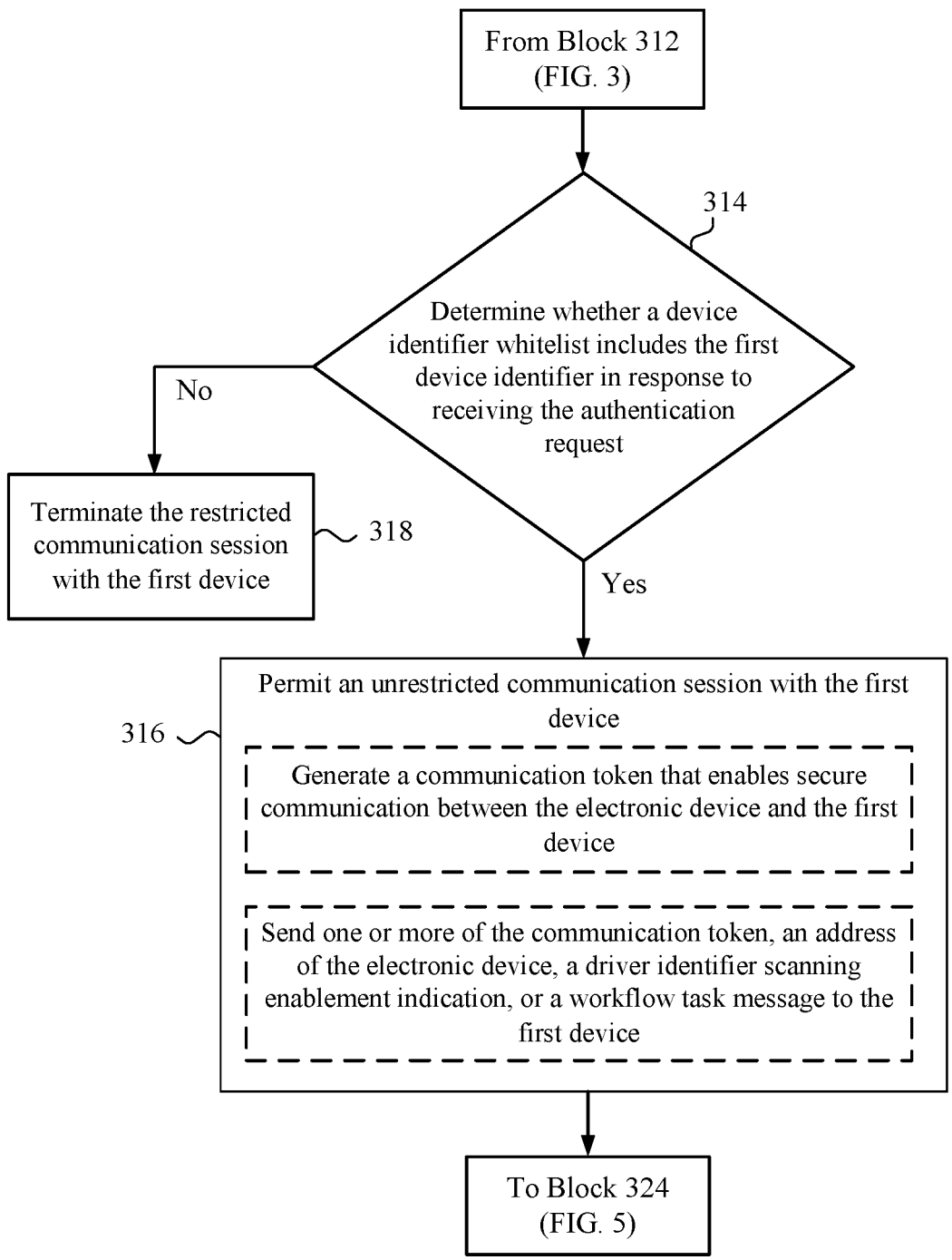
Figure 5:
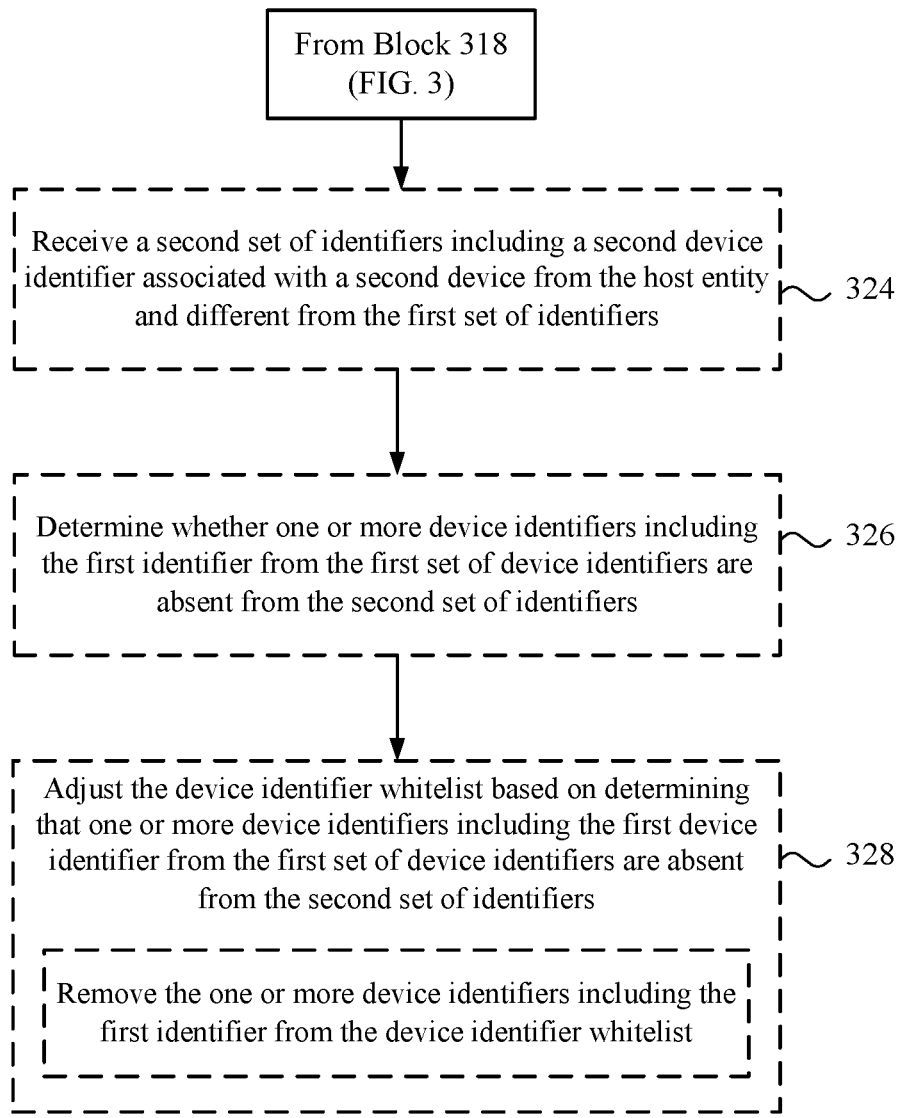

FIGS. 3-5 are flow diagrams of method 300 for facilitating secure communication between devices within, for example, a fleet vehicle in accordance with some aspects of the present disclosure. In some aspects, method 300 may be performed at MCP 144a (FIGS. 1 and 2). Some operations in method 300 may be combined, the order of some operations may be changed, and some operations may be omitted.

At block 302, method 300 may optionally receive, via a second communication channel different from a first communication channel, a first set of device identifiers including the first device identifier associated with the first device from a host entity. For example, MCP 144a (FIGS. 1 and 2) may execute one or more components and/or modules (e.g., communication component 160, FIG. 1) to receive, via a second communication channel 220 (FIG. 2) between a host entity (e.g., NMC 112, FIGS. 1 and 2) and the electronic device (e.g., MCP 144a, FIGS. 1 and 2) and different from a first communication channel 224 (FIG. 2), a first set of device identifiers (e.g., mobile directory number or host generated unique identifiers) including the first device identifier 148 (FIG. 1) associated with the first device (EP device 146, FIGS. 1 and 2) from a host entity (e.g., NMC 112, FIGS. 1 and 2).

In some aspects, as part of receiving the first set of device identifiers, a configuration message including the first set of device identifiers may be received from the host entity (e.g., NMC 112, FIGS. 1 and 2) via the first communication channel 224 (FIG. 2) or a provisioning message including the first set of identifiers from a second host entity (e.g., mobile provisioning portal 214, FIG. 1) via a third communication channel 222 (FIG. 2) respectively different from the first host entity (e.g., NMC 112, FIGS. 1 and 2) and the first communication channel 224 (FIG. 2).

Further, at block 304, method 300 may optionally generate the device identifier whitelist including the first set of device identifiers. For instance, MCP 144a (FIGS. 1 and 2) may execute one or more components and/or modules (e.g., determination component 109) to generate the device identifier whitelist 121 (FIG. 1) including the first set of device identifiers in response to receiving the first set of device identifiers from the host device (e.g., NMC 112, FIGS. 1 and 2).

At block 306, method 300 may detect that a first device is within a communication range of the electronic device according to one or more communication protocols. For instance, MCP 144a (FIGS. 1 and 2) may execute one or more components and/or modules (e.g., communication component 109 and communication component 160, FIG. 1) to detect that a first device (e.g., EP device, FIGS. 1 and 2) is within a communication range of the electronic device (e.g., MCP 144a, FIGS. 1 and 2) according to one or more communication protocols.

Additionally, at block 308, method 300 may establish a restricted communication session with the first device. For instance, MCP 144a (FIGS. 1 and 2) may execute one or more components and/or modules (e.g., communication component 160, FIG. 1) to establish a restricted communication session (e.g., pairing session) with the first device (e.g., EP device 146, FIGS. 1 and 2) based on detecting that the first device is within communication range of the electronic device (e.g., MCP 144a, FIGS. 1 and 2).

Moreover, at block 310, method 300 may receive, via a first communication channel associated with the one or more communication protocols, an authentication request including a first device identifier from the first device. For instance, MCP 144a (FIGS. 1 and 2) may execute one or more components and/or modules (e.g., communication component 160, FIG. 1) to receive, via a first communication channel 224 (FIG. 2) associated with the one or more communication protocols (e.g., Bluetooth or Wi-Fi), an authentication request including a first device identifier 148 (FIG. 1) from the first device (e.g., EP device 146, FIGS. 1 and 2) in response to establishing the initial communication session (e.g., pairing session) with the first device.

At block 314, method 300 may determine whether a device identifier whitelist includes the first device identifier in response to receiving the authentication request. For instance, MCP 144a (FIGS. 1 and 2) may execute one or more components and/or modules (e.g., determination component 109, FIG. 1) to determine whether a device identifier whitelist 121 (FIG. 1) includes the first device identifier 148 (FIG. 1) in response to receiving the authentication request. In some aspects, the device identifier whitelist 121 permits a device (e.g., EP device 146, FIGS. 1 and 2) having an associated device identifier (e.g., first device identifier 148, FIG. 1) within the device identifier whitelist 121 (FIG. 1) to communicate with the electronic device (e.g., MCP 144a).

Method 300 may proceed to block 316 based on a determination that the device identifier whitelist includes the first device identifier. Specifically, at block 316, method 300 may permit an unrestricted communication session with the first device. For instance, MCP 144a (FIGS. 1 and 2) may execute one or more components and/or modules (e.g., communication component 160, FIG. 1) to permit an unrestricted communication session using, for example, a communication token with the first device (e.g., EP device 146, FIGS. 1 and 2).

In some aspects, permitting an unrestricted communication session with the first device includes generating a communication token that enables secure communication between the electronic device MCP 144a (FIGS. 1 and 2) and the first device (e.g., EP device 146, FIGS. 1 and 2). For example, the communication token enables one or both of a synchronization of data between the MCP 144a (FIGS. 1 and 2) and the first device (e.g., EP device 146, FIGS. 1 and 2) or a status retrieval of one or more messages or files of the first device (e.g., EP device 146, FIGS. 1 and 2).

In some aspects, authentication request includes a version identifier of an application running on the first device. Further, as part of or in addition to the determination at block 310, method 300 may optionally determine whether the version identifier of the application running on the first device (e.g., EP device 146, FIGS. 1 and 2) satisfies a compatible version identifier at the electronic device MCP 144a (FIGS. 1 and 2). Further, as part of or in addition to permitting the unrestricted communication session at block 316, method 300 may optionally permit communication in accordance with a determination that the version identifier of the application running on the first device satisfies the compatible version identifier at the electronic device.

Otherwise, at block 318, method 300 may terminate the restricted communication session with the first device. For example, MCP 144a (FIGS. 1 and 2) may execute one or more components and/or modules (e.g., communication component 160, FIG. 1) to terminate the restricted communication session with the first device (e.g., EP device 146, FIGS. 1 and 2).

In addition, at block 324, method 300 may receive a second set of identifiers including a second device identifier associated with a second device from the host entity and different from the first set of identifiers. For instance, MCP 144a (FIGS. 1 and 2) may execute one or more components and/or modules (e.g., communication component 160, FIG. 1) to receive a second set of identifiers including a second device identifier associated with a second device from the host entity (e.g., NMC 112, FIGS. 1 and 2) and different from the first set of identifiers.

In some aspects, each of the first set of device identifiers including the first device identifier 148 (FIG. 1) and the second set of device identifier including the second device identifier is one of a mobile directory number (e.g., phone number) or a device identifier generated by a host entity (e.g., NMC 112, FIG. 1).

At block 326, method 300 may determine whether one or more device identifiers including the first identifier from the first set of device identifiers are absent from the second set of identifiers. For example, MCP 144a (FIGS. 1 and 2) may execute one or more components and/or modules (e.g., determination component 109, FIG. 1) to determine whether one or more device identifiers including the first identifier 148 (FIG. 1) from the first set of device identifiers are absent from the second set of identifiers.

At block 328, method 300 may adjust the device identifier whitelist based on determining that one or more device identifiers including the first device identifier from the first set of device identifiers are absent from the second set of identifiers. For instance, MCP 144a (FIGS. 1 and 2) may execute one or more components and/or modules (e.g., communication component 109, FIG. 1) to adjust the device identifier whitelist 121 (FIG. 1) based on determining that one or more device identifiers including the first device identifier 148 (FIG. 1) from the first set of device identifiers are absent from the second set of identifiers. In some aspects, adjusting the device identifier whitelist 121 (FIG. 1) includes removing the one or more device identifiers including the first identifier 148 (FIG. 1) from the device identifier whitelist.

Figure 6:
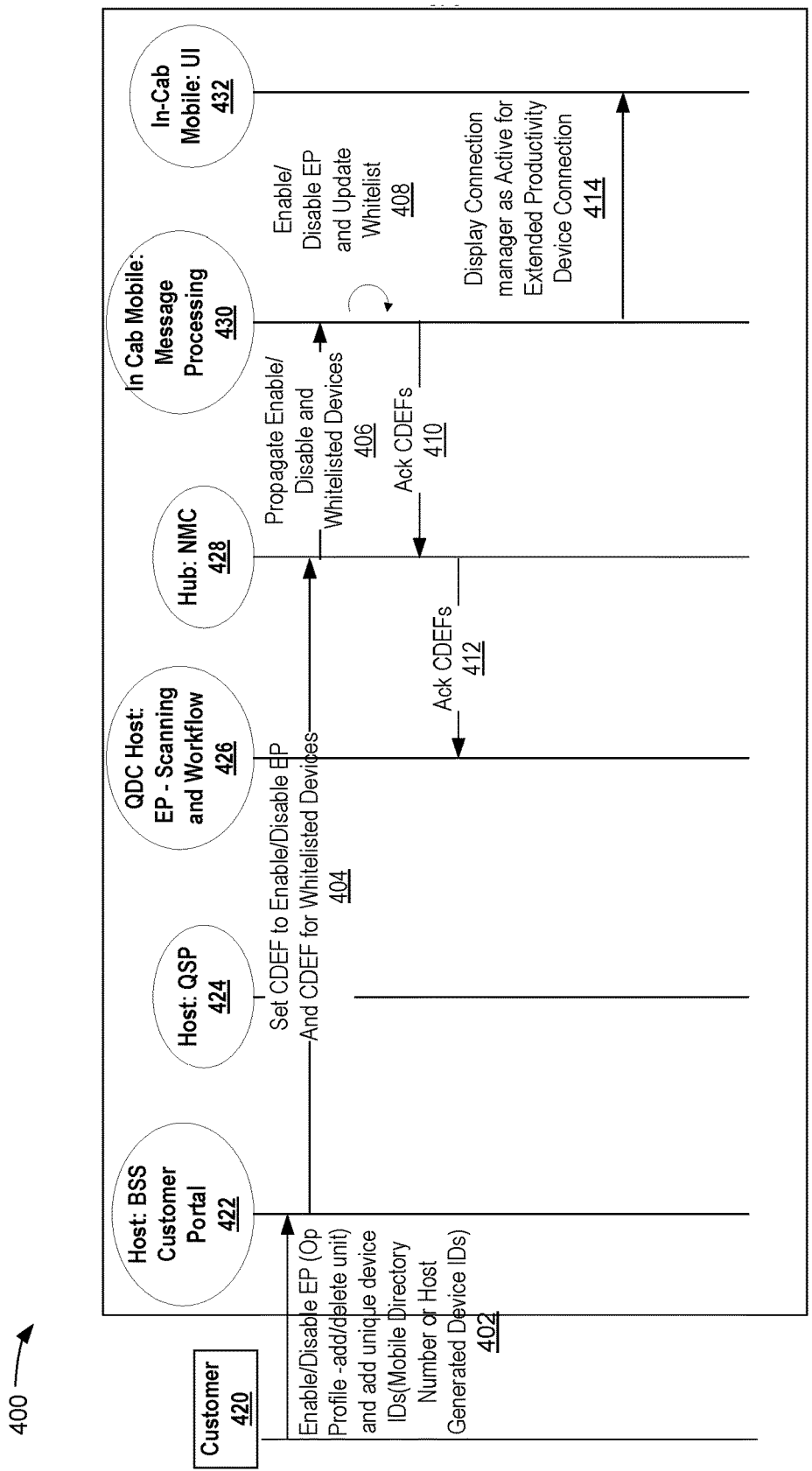
FIG. 6 is a conceptual diagram of a secure communication scheme among various entities within a communication system in accordance with some aspects of the present disclosure.

Referring to FIG. 6, in operation, a secure communication scheme (e.g., a signaling chart) 400 illustrates one non-limiting example of the signaling that may be associated with method 300 for allowing secure communication between devices, for example, between a customer 420, host 422, 424, and 426, hub 428, and an in-cab mobile device 430 and 432. In some aspects, customer 420 may be the same as or similar to host entity 212 (FIG. 2). Further, in some aspects, host 422, 424, and 426 may be the same as or similar to NMC 112 (FIGS. 1 and 2). In some aspects, in-cab mobile device 430 and 432 may be the same as or similar to MCP 144a (FIGS. 1 and 2).

In an aspect, at 402, a customer 420 may enable/disable an operation of an EP device (such as EP device 146, FIG. 1) at in-cab mobile device (e.g., MCP 144a) by adding/deleting operator profiles, and/or may add unique device identifications (e.g., device identifiers), such as mobile directory numbers or host generated IDs associated with authorized devices. Further, at 404, the host BSS customer portal 422 may transmit a signal to hub NMC 428 (e.g., NMC 112, FIG. 1) to set CDEF to enable/disable the EP device and CDEF for whitelisted devices.

In an aspect, at 406, hub NMC 428 (e.g., NMC 112, FIG. 1) may transmit a signal to propagate enable/disable and whitelisted devices to the message processing of in-cab mobile device 430 (e.g., MCP 144a). That is, the device identifiers of the authorized/whitelisted devices are to be propagated or sent to the message processing of in-cab mobile device 430 (e.g., MCP 144a). As a result, at 408, in-cab mobile device (e.g., MCP 144a) may enable/disable the EP device (e.g., EP device 148, FIG. 1) and update whitelist. At 410, the message processing of in-cab mobile device 430 may transmit acknowledgment (ACK) CDEFs to hub NMC (e.g., NMC 112, FIG. 1) which in turn, at 412, may transmit the ACK CDEFs to QDC host EP scanning and workflow component. Moreover, at 414, message processing of in-cab mobile computing device may display that the connection manager component as being active for extended productivity device connection at the user interface (UI) of in-cab mobile device (e.g., MCP 144a).

Figure 7:
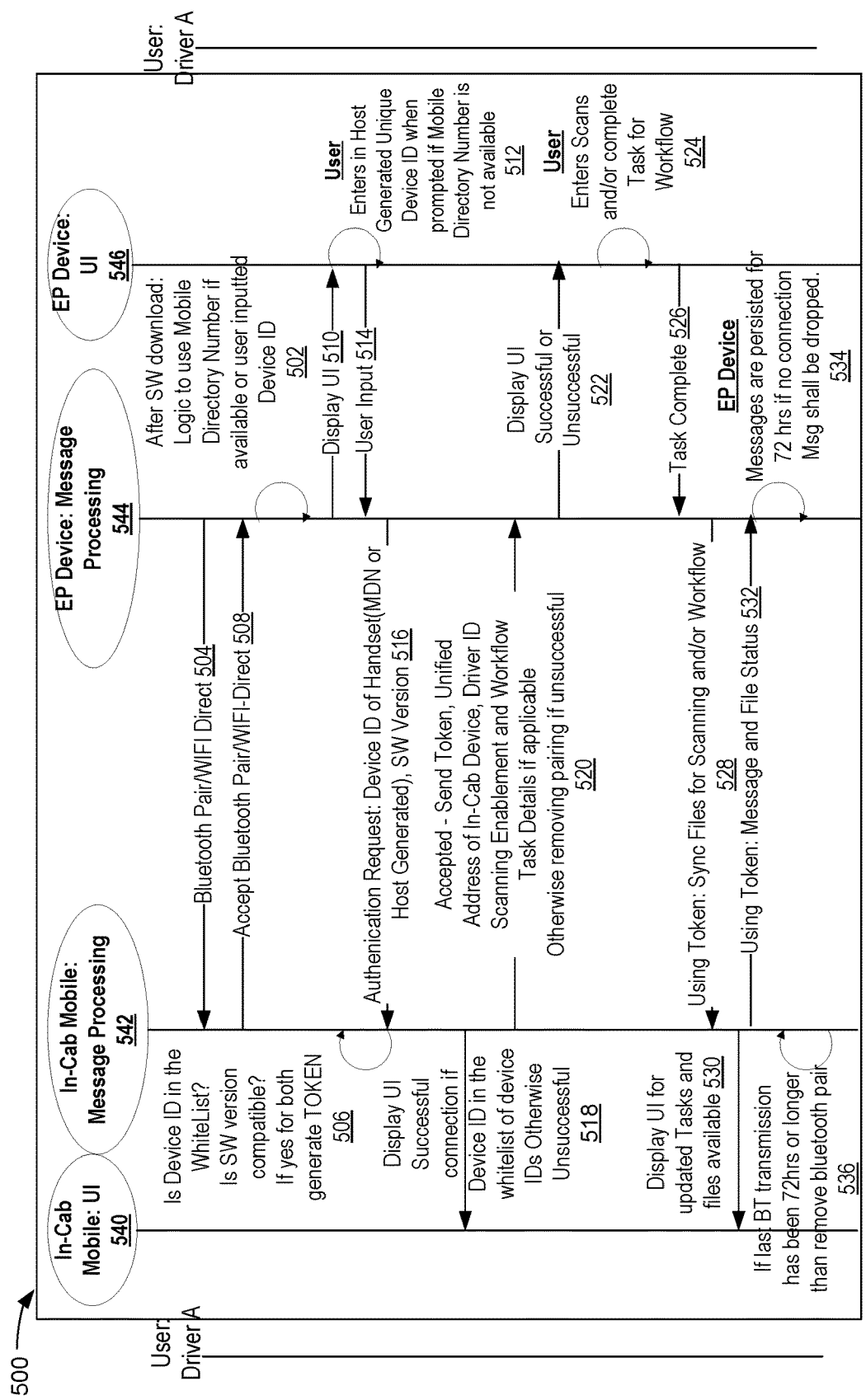
FIG. 7 is a conceptual diagram of a secure communication scheme among various entities, notably a mobile computing platform and an extended productivity device, within a communication system in accordance with some aspects of the present disclosure.

Referring to FIG. 7, in operation, a secure communication scheme (e.g., signaling chart) 500 illustrates the signaling for allowing secure communication between devices, for example, between EP device 146 (FIG. 1) and an in-cab mobile device (e.g., MCP 144a within vehicle 104a, FIG. 1). In an aspect, at 502, a UI 546 of EP device 146 (FIG. 1) may establish logic to use its mobile directory number if available or a user inputted device ID after a software (SW) download that provisions the EP device. At 504, the message processing component 544 of EP device 146 (FIG. 1) may transmit a signal corresponding to a Bluetooth pair or Wi-Fi direct connection message to the message processing component 544 of in-cab mobile device. In response, at 506, message processing 542 of in-cab mobile device may determine whether the device identifier (ID) is in the whitelist and/or if the SW version of an application running at EP device 146 (FIG. 1) is compatible.

If the in-cab mobile device determines that the device ID is in the whitelist and/or that the SW version of the application running at EP device 146 (FIG. 1) is compatible, then it may generate a token and, at 508, transmit a signal corresponding to an acceptance of the Bluetooth pair/Wi-Fi direct connection to EP mobile device. Further, at 510, message processing of EP mobile device may display a UI 540 for entering in an identifier, and at 512, a user may enter in host generated unique device ID when prompted if mobile directory number (MDN) is not available. As a result, at 514, the UI of EP mobile device may transmit the user input to message processing of EP mobile device, which in turn, at 516, may transmit a signal to message processing of in-cab mobile device corresponding to an authentication request with the device ID of handset (e.g., MDN or host generated) and the SW version.

At 518, message processing 542 of in-cab mobile device may transmit to the UI for display a successful connection if the device ID is included in the whitelist 121 of device IDs, or an unsuccessful connection if the device ID is not included. At 520, message processing of in-cab mobile computing device may transmit a signal to the message processing component of EP device 146 (FIG. 1) corresponding to either an acceptance of an establishment of a secure connection or may remove the pairing if the authentication was unsuccessful. As part of the acceptance or successful authentication, the signal at 520 may include a token, unified address of in-cab device, driver ID scanning enablement and workflow task details if applicable.

At 522, message processing component 544 of EP device 146 (FIG. 1) may transmit to the UI to either display successful or unsuccessful. At 524, the user may enter scans and/or complete tasks for a workflow, and at 526 the UI may transmit to message processing component of EP device 146 (FIG. 1) the task complete message. At 528, message processing 544 of EP device 146 (FIG. 1) may transmit a signal including or using the token to message processing of in-cab mobile device to synchronize files for scanning and/or workflow between EP device 146 (FIG. 1) and in-cab mobile device. At 530, message processing 542 of in-cab mobile device may transmit a signal to UI 540 to display the updated tasks and files available. Additionally, at 532, message processing 542 may transmit a signal including or using the token to message processing of EP device 146 (FIG. 1) to retrieve one or more messages and/or file statuses. At 534, the EP device 146 (FIG. 1) may establish that messages are persisted for 72 hours if no connection exists, and the messages shall be dropped. Moreover, at 536, in-cab mobile device may determine if the last Bluetooth transmission has been 72 hours or longer and, if so, then to remove the Bluetooth pair.

Figure 8:
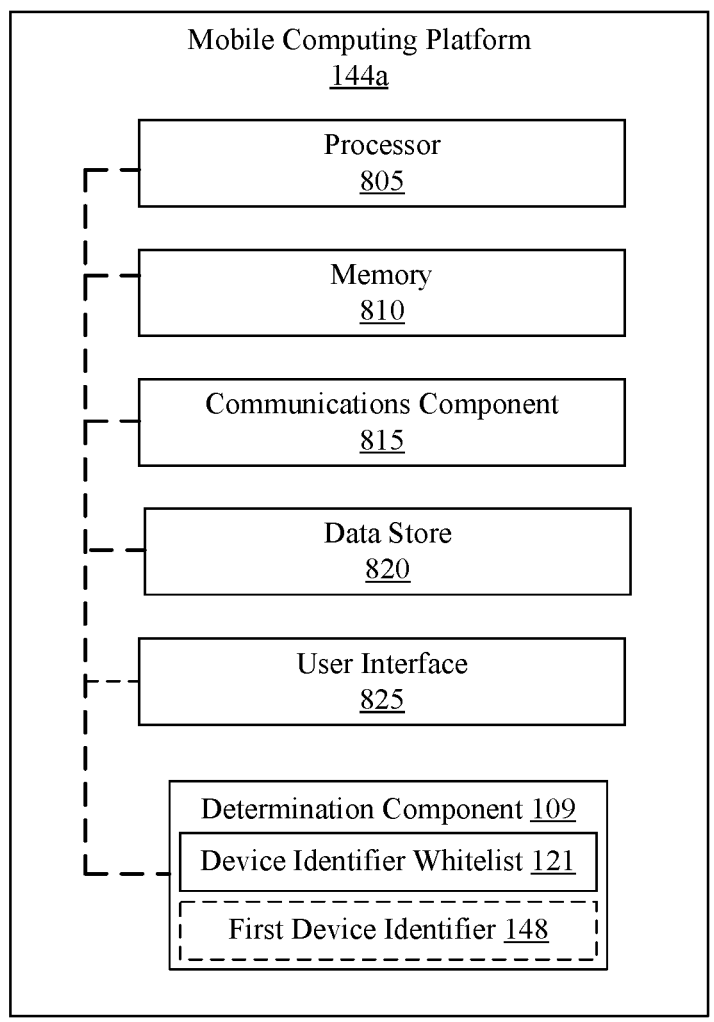
FIG. 8 is a block diagram of an example of an aspect of a mobile computing platform (MCP) in accordance with some aspects of the present disclosure.

Referring to FIG. 8, in an example that should not be construed as limiting, MCP 206 may include additional components that operate in conjunction with vehicle management module(s) 207, which may be implemented in specially programmed computer readable instructions or code, firmware, hardware, or some combination thereof.

In an aspect, features described herein with respect to the functions of vehicle management module(s) 144a may be implemented in or executed using one or any combination of processor 805, memory 810, communications module 815, and data store 820. For example, determination component 109 may be defined or otherwise programmed as one or more processor modules of processor 805. Further, for example, determination component 109 may be defined as a computer-readable medium (e.g., a non-transitory computer-readable medium) stored in memory 810 and/or data store 820 and executed by processor 805.

Moreover, for example, inputs and outputs relating to operations of determination component 109 may be provided or supported by communications module 815, which may provide a bus between the modules of computer device or an interface for communication with external devices or modules. In some aspects, and as discussed above, the determination component 109 may include device identifier whitelist 121 and optionally first device identifier 148. Processor 805 can include a single or multiple set of processors or multi-core processors. Moreover, processor 805 can be implemented as an integrated processing system and/or a distributed processing system.

Memory 810 may operate to allow storing and retrieval of data used herein and/or local versions of applications and/or software and/or instructions or code being executed by processor 805, such as to perform the respective functions of determination component 109 described herein. Memory 810 can include any type of memory usable by a computer, such as random access memory (RAM), read only memory (ROM), tapes, magnetic discs, optical discs, volatile memory, non-volatile memory, and any combination thereof.

Communications module 815 is operable to establish and maintain communications with one or more internal components/modules or external devices utilizing hardware, software, and services as described herein. Communications component 815 may carry communications between modules on MCP 144a, as well as between user and external devices, such as devices located across a communications network and/or devices serially or locally connected to MCP 144a. For example, communications component 815 may include one or more buses, and may further include transmit chain modules and receive chain modules associated with a transmitter and receiver, respectively, or a transceiver, operable for interfacing with external devices.

Additionally, data store 580, which can be any suitable combination of hardware and/or software, which provides for mass storage of information, databases, and programs employed in connection with aspects described herein. For example, data store 820 may be a data repository for applications not currently being executed by processor 805.

MCP 144a may additionally include a user interface module 825 operable to receive inputs from a user, and further operable to generate outputs for presentation to the user. User interface module 825 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 825 may include one or more output devices, including but not limited to a display, a speaker, a haptic feedback mechanism, a printer, any other mechanism capable of presenting an output to a user, or any combination thereof.

Figure 9:
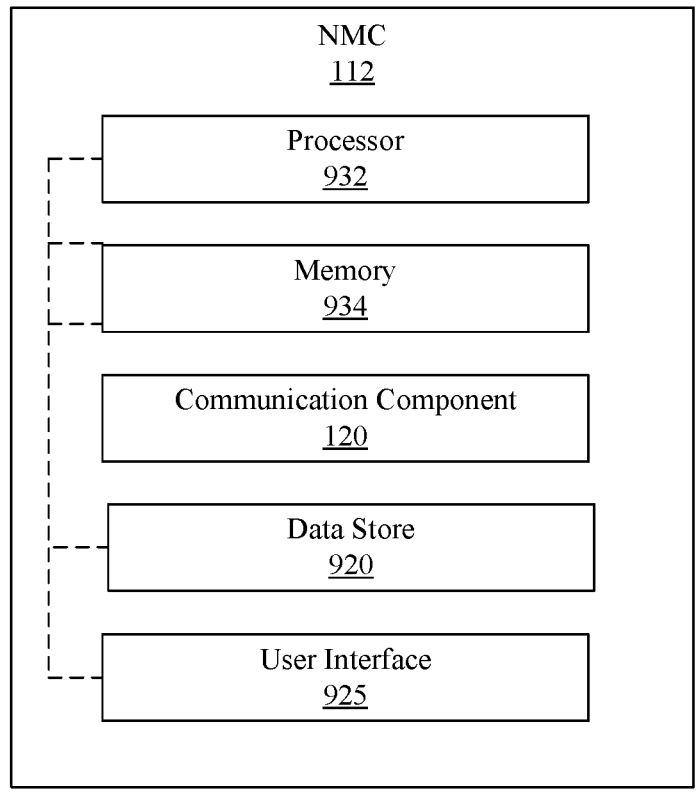
FIG. 9 is a block diagram of an example of an aspect of a network management center (NMC) in accordance with some aspects of the present disclosure.

Referring to FIG. 9, in an example that should not be construed as limiting, NMC 112 may include additional components for implementing secure communication via communication component 120, which may be implemented in specially programmed computer readable instructions or code, firmware, hardware, or some combination thereof.

In an aspect, the features of communication component 120 described herein may be implemented in or executed using one or any combination of processor 932, memory 934, and data store 920. For example, communication component 120 may be defined or otherwise programmed as one or more processor modules of processor 932. Further, for example, advanced warning module 920 and vehicle control module 924 may be defined as a computer-readable medium (e.g., a non-transitory computer-readable medium) stored in memory 934 and/or data store 910 and executed by processor 932. Moreover, for example, inputs and outputs relating to operations of communication component 120, which may provide a bus between the components/modules of NMC 112 or an interface for communication with external devices or components/modules.

Processor 932 can include a single or multiple set of processors or multi-core processors. Moreover, processor 932 can be implemented as an integrated processing system and/or a distributed processing system.

Memory 934 may be operable for storing and retrieving data used herein and/or local versions of applications and/or software and/or instructions or code being executed by processor 932, such as to perform the respective functions of the respective entities described herein. Memory 934 can include any type of memory usable by a computer, such as random access memory (RAM), read only memory (ROM), tapes, magnetic discs, optical discs, volatile memory, non-volatile memory, and any combination thereof.

Communications component 120 may be operable to establish and maintain communications with one or more internal components/modules and/or external devices utilizing hardware, software, and services as described herein. Communications component 120 may carry communications between modules on NMC 112, as well as between user and external devices, such as devices located across a communications network and/or devices serially or locally connected to NMC 112. For example, communications component 120 may include one or more buses, and may further include transmit chain modules and receive chain modules associated with a transmitter and receiver, respectively, or a transceiver, operable for interfacing with external devices.

Additionally, data store 920, which can be any suitable combination of hardware and/or software, which provides for mass storage of information, databases, and programs employed in connection with aspects described herein. For example, data store 920 may be a data repository for applications not currently being executed by processor 932.

NMC 112 may additionally include a user interface module 925 operable to receive inputs from a user, and further operable to generate outputs for presentation to the user. User interface module 925 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 926 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. 3-5 which may illustrate various process flows.

In the above description, the term "software product" may include files having executable content, such as: object code, scripts, byte code, markup language files, and patches. In addition, a "software product" referred to herein, may also include files that are not executable in nature, such as documents that may need to be opened or other data files that need to be accessed.

The term "software update" may also include files having executable content, such as: object code, scripts, byte code, markup language files, and patches. In addition, "software update" referred to herein, may also include files that are not executable in nature, such as documents that may need to be opened or other data files that need to be accessed.

As used in this description, the terms "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of secure communication between devices, comprising:
   receiving, at an electronic device and via a second communication channel different from a first communication channel, a first set of device identifiers from a host entity, the first set of identifiers including a first device identifier associated with a first device, wherein the first device is remote from the electronic device and the host entity;
   generating a device identifier whitelist including one or more device identifiers from the first set of device identifiers in response to receiving the first set of device identifiers from the host entity, wherein the device identifier whitelist permits any device having an associated device identifier within the device identifier whitelist to securely communicate with the electronic device;
   detecting, at the electronic device, that the first device is within a communication range of the electronic device according to one or more communication protocols;
   establishing a restricted communication session with the first device based on detecting that the first device is within communication range of the electronic device;
   receiving, via the first communication channel associated with the one or more communication protocols, an authentication request including the first device identifier from the first device in response to establishing the restricted communication session with the first device;
   determining whether the device identifier whitelist includes the first device identifier in response to receiving the authentication request;
   in accordance with a determination that the device identifier whitelist includes the first device identifier, permitting an unrestricted communication session using a communication token with the first device, wherein the communication token enables one or both of a synchronization of data between the electronic device and the first device or a status retrieval of one or more messages or files of the first device; and
   in accordance with a determination that the device identifier whitelist does not include the first identifier, terminating the restricted communication session with the first device.

2. The method of claim 1, wherein permitting an unrestricted communication session with the first device includes:
   generating the communication token that enables secure communication between the electronic device and the first device; and
   sending one or more of the communication token, an address of the electronic device, a driver identifier scanning enablement indication, or a workflow task message to the first device.

3. The method of claim 1, further comprising:
   receiving, at the electronic device, a second set of identifiers from a host entity, the second set of identifiers including a second device identifier associated with a second device different from the first set of identifiers;
   determining whether one or more device identifiers including the first identifier from the first set of device identifiers are absent from the second set of identifiers; and
   adjusting the device identifier whitelist based on determining that one or more device identifiers including the first identifier from the first set of device identifiers are absent from the second set of identifiers.

4. The method of claim 3, wherein adjusting the device identifier whitelist includes removing the one or more device identifiers including the first identifier from the device identifier whitelist.

5. The method of claim 3, wherein each of the first set of device identifiers including the first device identifier and the second set of device identifier including the second device identifier is one of a mobile directory number or a device identifier generated by a host entity.

6. The method of claim 1, wherein receiving the first set of device identifiers includes receiving a configuration message including the first set of device identifiers from the host entity via the first communication channel or a provisioning message including the first set of identifiers from a second host entity via the second communication channel respectively different from the first host entity and the first communication channel.

7. The method of claim 1, wherein the authentication request includes a version identifier of an application running on the first device.

8. The method of claim 7, wherein determining whether the device identifier whitelist includes the first device identifier includes determining whether the version identifier of the application running on the first device satisfies a compatible version identifier at the electronic device.

9. The method of claim 8, wherein permitting the unrestricted communication session with the first device includes permitting communication in accordance with a determination that the version identifier of the application running on the first device satisfies the compatible version identifier at the electronic device.

10. The method of claim 1, wherein receiving the set of device identifiers includes receiving according to an over-the-air communication protocol.

11. The method of claim 10, wherein the over-the-air communication protocol includes one of a wide local area network protocol or a terrestrial protocol.

12. The method of claim 1, wherein the one or more communication protocols include one of Bluetooth or a wide local area network protocol.

13. The method of claim 1, wherein the electronic device is coupled to a vehicle.

14. An apparatus for secure communication between devices, comprising:
   a processor;
   a memory coupled to the processor, wherein the memory includes instructions executable by the processor to:
      receive, via a second communication channel different from a first communication channel, a first set of device identifiers from a host entity, the first set of identifiers including a first device identifier associated with a first device, wherein the first device is remote from the electronic device and the host entity;
      generate a device identifier whitelist including one or more device identifiers from the first set of device identifiers in response to receiving the first set of device identifier from the host device, wherein the device identifier whitelist permits any device having an associated device identifier within the device identifier whitelist to securely communicate with the electronic device;
      detect that the first device is within a communication range of the electronic device according to one or more communication protocols;
      establish a restricted communication session with the first device based on detecting that the first device is within communication range of the electronic device;
      receive, via the first communication channel associated with the one or more communication protocols, an authentication request including the first device identifier from the first device in response to establishing the restricted communication session with the first device;
      determine whether the device identifier whitelist includes the first device identifier in response to receiving the authentication request;
      in accordance with a determination that the device identifier whitelist includes the first device identifier, permit an unrestricted communication session using a communication token with the first device, wherein the communication token enables one or both of a synchronization of data between the electronic device and the first device or a status retrieval of one or more messages or files of the first device; and
      in accordance with a determination that the device identifier whitelist does not include the first identifier, terminate the restricted communication session with the first device.

15. The apparatus of claim 14, wherein to permit an unrestricted communication session with the first device, the memory further includes instructions executable by the processor to:
   generate the communication token that enables secure communication between the electronic device and the first device; and
   send one or more of the communication token, an address of the electronic device, a driver identifier scanning enablement indication, or a workflow task message to the first device.

16. A non-transitory computer readable medium for secure communication between devices, wherein the computer readable medium comprises code for:
   receiving, via a second communication channel different from a first communication channel, a first set of device identifiers from a host entity, the first set of identifiers including a first device identifier associated with a first device, wherein the first device is remote from the electronic device and the host entity;
   generating a device identifier whitelist including one or more device identifiers from the first set of device identifiers in response to receiving the first set of device identifier from the host device, wherein the device identifier whitelist permits any device having an associated device identifier within the device identifier whitelist to securely communicate with the electronic device;
   detecting that the first device is within a communication range of the electronic device according to one or more communication protocols;
   establishing a restricted communication session with the first device based on detecting that the first device is within communication range of the electronic device;
   receiving, via the first communication channel associated with the one or more communication protocols, an authentication request including the first device identifier from the first device in response to establishing the restricted communication session with the first device;
   determining whether the device identifier whitelist includes the first device identifier in response to receiving the authentication request;
   in accordance with a determination that the device identifier whitelist includes the first device identifier, permitting an unrestricted communication session using a communication token with the first device, wherein the communication token enables one or both of a synchronization of data between the electronic device and the first device or a status retrieval of one or more messages or files of the first device; and in accordance with a determination that the device identifier whitelist does not include the first identifier, terminating the restricted communication session with the first device.

17. The non-transitory computer readable medium of claim 16, wherein permitting an unrestricted communication session with the first device, the computer readable medium comprises code for:

generating the communication token that enables secure communication between the electronic device and the first device; and sending one or more of the communication token, an address of the electronic device, a driver identifier scanning enablement indication, or a workflow task message to the first device.

18. The method of claim 1, further comprising:

enabling an operation of the first device based at least on the host entity adding one or more operator profiles; and disabling the operation of the first device based at least on the host entity deleting the one or more operator profiles.

19. The apparatus of claim 14, wherein the processor is further configured to:

enable an operation of the first device based at least on the host entity adding one or more operator profiles; and disable the operation of the first device based at least on the host entity deleting the one or more operator profiles.

20. The non-transitory computer readable medium of claim 16, further comprising code for:

enabling an operation of the first device based at least on the host entity adding one or more operator profiles; and disabling the operation of the first device based at least on the host entity deleting the one or more operator profiles.

\* \* \* \* \*